(12) United States Patent
Honda

(10) Patent No.: US 7,210,055 B2
(45) Date of Patent: Apr. 24, 2007

(54) ELECTRONIC CONTROL APPARATUS

(75) Inventor: Takayoshi Honda, Kariya (JP)

(73) Assignee: DENSO Corporation, Kariya (JP)

( * ) Notice: Subject to any disclaimer, the term of this patent is extended or adjusted under 35 U.S.C. 154(b) by 487 days.

(21) Appl. No.: 10/283,333

(22) Filed: Oct. 30, 2002

(65) Prior Publication Data
US 2003/0093189 A1 May 15, 2003

(30) Foreign Application Priority Data
Oct. 30, 2001 (JP) ............... 2001-332535

(51) Int. Cl.
G06F 1/04 (2006.01)
(52) U.S. Cl. .................. 713/502; 713/500
(58) Field of Classification Search .............. None
See application file for complete search history.

(56) References Cited

U.S. PATENT DOCUMENTS

| | | | | |
|---|---|---|---|---|
| 4,638,237 A | * | 1/1987 | Fernandez | 340/636.1 |
| 4,933,535 A | * | 6/1990 | Zabinski | 219/497 |
| 5,575,265 A | | 11/1996 | Kurihara et al. | |
| 5,890,474 A | | 4/1999 | Schnaibel et al. | |
| 5,913,067 A | * | 6/1999 | Klein | 713/300 |
| 6,169,942 B1 | * | 1/2001 | Miller et al. | 701/29 |
| 6,227,037 B1 | | 5/2001 | Kawamura et al. | |
| 6,240,534 B1 | * | 5/2001 | Nakane | 714/55 |
| 6,414,402 B1 | * | 7/2002 | Lutz | 307/10.6 |
| 6,531,872 B1 | * | 3/2003 | Carr et al. | 324/379 |

FOREIGN PATENT DOCUMENTS

| | | |
|---|---|---|
| JP | 60-145442 | 7/1985 |
| JP | 1-140350 | 6/1989 |
| JP | 9-92111 | 4/1997 |
| JP | 2001-323836 | 11/2001 |

OTHER PUBLICATIONS

Japanese Search/Examination Report—Nov. 21, 2005.

* cited by examiner

Primary Examiner—Rehana Perveen
Assistant Examiner—Tse Chen
(74) Attorney, Agent, or Firm—Nixon & Vanderhye P.C.

(57) ABSTRACT

In an in-vehicle electronic control apparatus (ECU), when a microcomputer stops operation, a timer IC starts the count-up operation. When the count value reaches a preset value, a signal from the timer IC becomes high and a power supply voltage is outputted from a power supply IC to activate the microcomputer. The microcomputer reads the count value from the timer IC when it starts the operation. If such a count value has exceeded the specified value, the microcomputer determines occurrence of a failure. Therefore, if the timer IC cannot activate the power supply IC, the microcomputer can detect a failure upon activation with turning on of an ignition switch.

4 Claims, 13 Drawing Sheets

ELECTRONIC CONTROL APPARATUS

FIELD OF THE INVENTION

The present invention relates to an electronic control apparatus for controlling an engine or the like of a vehicle and particularly to the technology for detecting a failure of a timer circuit for measuring an operation stop period of a microcomputer.

BACKGROUND OF THE INVENTION

An electronic control apparatus for controlling a vehicle engine is provided with a sub-power supply circuit which always outputs the constant power supply voltage Vos based on the power of a battery, and a main power supply circuit which does not always output the constant power supply voltage Vom based on the power of the battery but only when an ignition switch of a vehicle is turned on.

The power supply voltage Vom from the main power supply circuit is supplied to a microcomputer or the like which consumes a large amount of power, while the power supply voltage Vos from the sub-power supply circuit is supplied to the circuits and memory (so-called backup RAM) or the like which must be always operated but consume remarkably small amount of power in comparison with the microcomputer or the like.

Particularly, the electronic control apparatus of this type measures, with a timer circuit which is operated by the power supply voltage Vos from the sub-power supply circuit, a period where the microcomputer is not in operation (the period in which the power supply voltage Vom is not supplied from the main power supply circuit), and activates the microcomputer with the timer circuit, when the measured period reaches the predetermined specified time, by controlling the main power supply circuit to output the power supply voltage Vom. Such timer circuit permits, even if the microcomputer is not always operated, the desired process when the specified time has passed from the timing where the ignition switch is turned off, reducing the total power consumption of the apparatus remarkably.

As the electronic control apparatus which requires such timer circuit, an apparatus for diagnosis of an evaporative gas purge system is proposed in JP-A-1996-35452.

Specifically, in the diagnosis of the evaporative gas purge system of this type, a system of engine for collecting evaporated gas (evaporated fuel generated in a fuel tank) from a fuel tank is closed for pressurization or reduction of pressure and air-tightness of this system is inspected by detecting variation of pressure in this system. Immediately after the engine has been operated for a long period of time under the heavy load condition, it is difficult to attain the accurate result of inspection because the fuel in the fuel tank easily evaporates. Therefore, when the constant period has passed from stop of engine, the air-tightness of such evaporative gas purge system is tested by the microcomputer. In this case, if the microcomputer is always operated, when the engine stops (namely, the ignition switch is turned off), to measure the constant period explained above, power consumption when the ignition switch is turned off cannot be controlled, resulting in exhaustion of battery. Therefore, when the ignition switch is turned off, supply of the power supply voltage Vom to the microcomputer from the main power supply circuit is stopped. Thereafter, the timer circuit measures the operation stop period of the microcomputer and when the measured period reaches the constant period explained above, the timer circuit causes the main power supply circuit to output the power supply voltage Vom in order to activate the microcomputer.

In the electronic control apparatus comprising such a timer circuit, if a failure that the timer circuit cannot activate the main power supply circuit (the power supply voltage Vom is outputted from the main power supply circuit) is generated because of breaking of a signal line to output the operation command signal to the main power supply circuit from the timer circuit, such failure cannot be detected. Namely, even when the period from operation stop of the microcomputer reaches the specified time of the timer circuit, the main power supply circuit cannot be operated due to a failure of timer circuit, and thereafter if the power supply voltage Vom is outputted from the main power supply circuit after the ignition switch is turned on, the microcomputer cannot detect such event and executes the processes to be executed under the normal condition.

Thus, it is impossible for the microcomputer to discriminate the condition where the ignition switch is turned on to start the operation after the specified time has passed from generation of a failure in the timer circuit and thereby the main power supply circuit cannot be operated, and the condition where the ignition switch is turned on to start the operation before the period from stop of operation reaches the specified time.

SUMMARY OF THE INVENTION

It is therefore an object of the present invention to provide an electronic control apparatus wherein: a timer circuit is provided to measure the operation stop period of a microcomputer and activate the microcomputer by activating a power supply circuit for the microcomputer when the measured period reaches a preset time; and the timer circuit can surely detect the condition that the power supply circuit for the microcomputer cannot be activated because of generation of a failure.

An electronic control apparatus of the present invention comprises a timer circuit operated by a power supply voltage which is always outputted from the first power supply circuit, the second power supply circuit which outputs another power supply voltage, and a microcomputer operated by a power supply voltage outputted from the second power supply circuit. When the timer circuit executes the counting operation while the second power supply circuit does not output a power supply voltage and the count value reaches the preset value, the second power supply circuit outputs a power supply voltage to activate the microcomputer.

Particularly, the specified time is set to the value before the final value of the count value of timer circuit. When the second power supply circuit starts to output a power supply voltage, it is determined whether a count value of a timer circuit has exceeded the specified value or the determination value set to a value in the side of the final value of the count value of timer circuit. When the count value has exceeded the value explained above, function of the timer circuit is determined to be defective. The determination value may be employed, for example, in such condition that a delay time until the count value of timer circuit is detected after the count value reaches the specified value is larger than the count period of the timer circuit and the count value progresses during such delay time. This determination value may be set to the count value which is progressed from the specified value within the delay time.

Here, it is also possible to determine the function of timer circuit is defective when the operation is started with a power supply voltage from the first power supply circuit and the power supply voltage is not outputted from the second power supply circuit even when the count value of the timer circuit has exceeded the specified value.

Moreover, the microcomputer can determine, when it starts the operation by receiving the power supply voltage from the second power supply circuit, the function of the timer circuit is defective under the condition that an operation command signal to the second power supply circuit from the timer circuit is not in the active level and also under the condition that the count value of timer circuit is determined to be higher than the specified value or not and thereby the result is affirmative.

In order to prevent erroneous determination for a failure of the timer circuit, the microcomputer sets a flag indicating the drive from the timer circuit when the present drive is determined to be executed by the timer circuit with the activation cause determination process. Moreover, when the present drive is determined to be executed with a switch signal from the activation cause determination process, whether the flag is set or not is determined and when the flag is set, it is desirable that a failure is not determined with the failure detecting process.

DETAILED DESCRIPTION OF THE EMBODIMENTS (First Embodiment)

Figure 1:
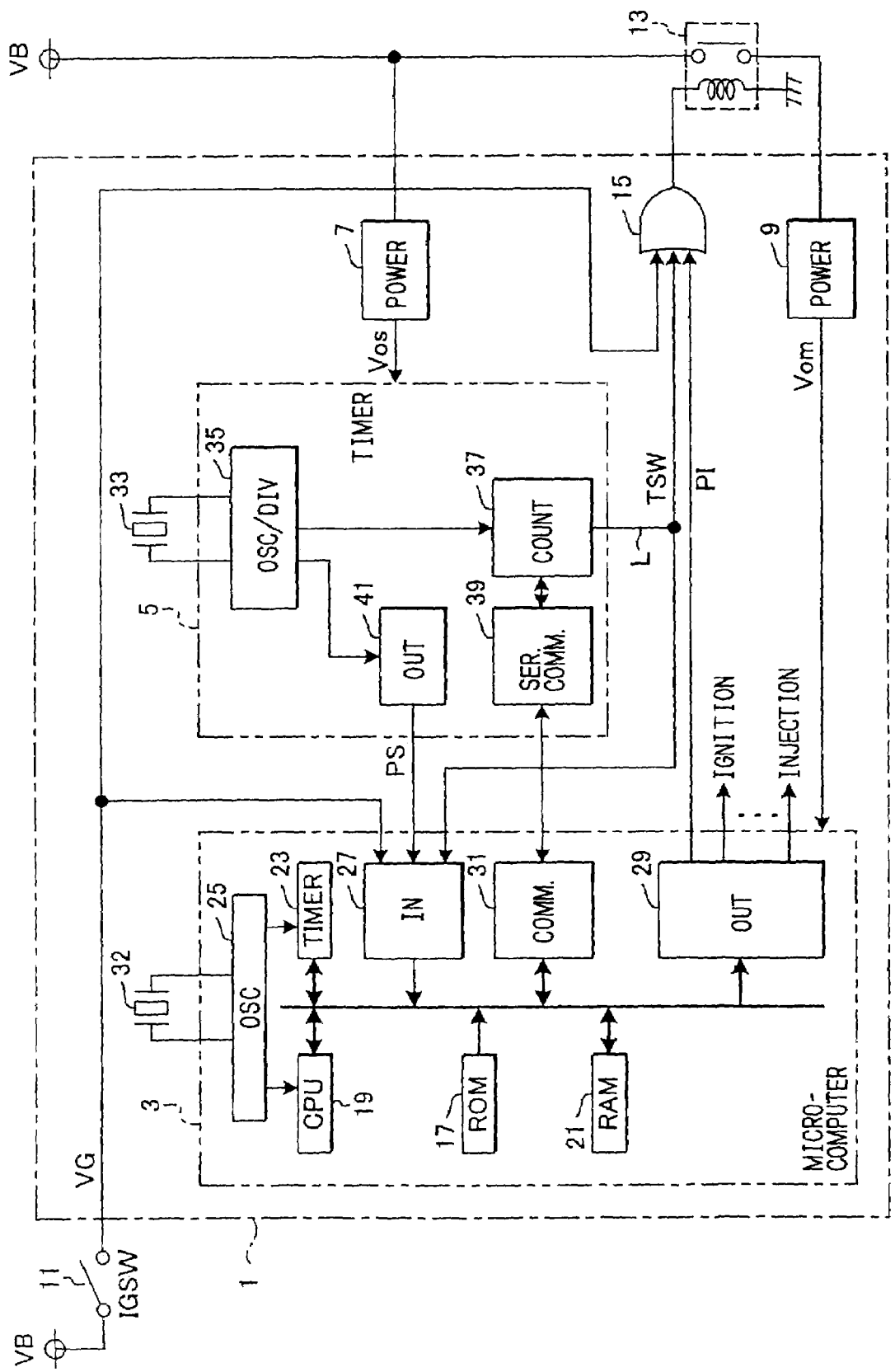
FIG. 1 is a block diagram illustrating an electronic control apparatus (ECU) as a first embodiment of the present invention.

As illustrated in FIG. 1, an ECU 1 comprises a microcomputer 3 for executing various processes for engine control, a timer IC 5 for measuring the period where the microcomputer 3 stops its operation, a power supply IC 7 for outputting the power supply voltage Vos of 5[V] to operate the timer IC 5 and a power supply IC 9 for outputting the power supply voltage Vom of 5[V] to operate the microcomputer 3.

A battery voltage VB of a vehicle is always supplied to the power supply IC 7. The power supply IC 7 always generates and outputs a power supply voltage Vos from the battery voltage VB. Moreover, when an ignition switch of the vehicle (hereinafter referred to as IGSW) 11 is turned on, or when a power supply activation signal TSW outputted from the timer IC 5 is in the high level or when a power supply holding signal PI outputted from the microcomputer 3 is in the high level, the battery voltage VB is supplied to the power supply IC 9. The power supply IC 9 generates and outputs the power supply voltage Vom from the battery voltage VB.

First, to the ECU 1, the IGSW signal VG (switch signal) indicating the ON/OFF state of the IGSW 11 is inputted via the IGSW 11. The IGSW signal becomes a high level when the IGSW 11 is turned on while it becomes a low level when the IGSW 11 is turned off. Moreover, the battery voltage VB is supplied to the power supply IC 9 via a contact of a relay 13 for supplying the power source voltage, provided at the external side of the ECU 1.

The ECU 1 is also provided with a drive circuit 15 which terminates (turns on) the contact of a relay 13 for supplying the power source voltage by feeding the power to the coil of the relay 13 when at least one of the IGSW signal VG, power supply activation signal TSW from the timer IC 5, power supply holding signal PI from the microcomputer 3 is in the high level. Although not illustrated in the figure, the battery voltage VB is always supplied to the drive circuit 15 to apply a current to the coil.

Accordingly, when any one of the IGSW signal VG, the power supply activation signal TSW from the timer IC 5, and the power supply holding signal PI from the microcomputer 3 is in the high level, the relay 13 for supplying the power source voltage turns on, then the battery voltage VB is supplied to the power supply IC 9, and thereby the power supply IC 9 outputs the power supply voltage Vom. The logical level of the signals VG, TSW, and PI is active level when it is in the high level while it is passive level when it is in the low level.

The power supply IC 9 is also provided with a power-on reset function for outputting a reset signal, when this IC starts to output the power supply voltage Vom, to the microcomputer 3 only for a very short period in which the power supply voltage Vom is assumed to be stabilized. Therefore, the microcomputer 3 starts operation from the initial state (activated) when the power supply IC 9 starts to output the power supply voltage Vom.

Meanwhile, the microcomputer 3 is formed of an ordinary single chip packaging a ROM 17 for storing programs, a CPU 19 for executing programs stored in the ROM 17, a RAM 21 for storing arithmetic operations result by the CPU 19, a free-run timer 23, an oscillation circuit 25 for generating operation clocks of the CPU 19 and the free-run timer 23, an input port 27, an output port 29 and a communication port 31 or the like. The oscillation circuit 25 generates the operation clocks by driving the oscillator 32 allocated in the external side of the microcomputer 3.

Moreover, although not illustrated in the figure, the microcomputer 3 is also provided with a non-volatile memory which can store the data even when supply of the power supply voltage Vom stops. As the non-volatile memory, a backup RAM to which the power supply voltage Vos is always supplied from the power supply IC 7 or a ROM (flash ROM or EEPROM) which allows reprogramming of data can be used.

Moreover, the timer IC 5 is also provided with an oscillation/frequency-dividing circuit 35 for generating the basic clock PS by driving the oscillator 33 allocated in the external side of the relevant IC 5 and also generating a divided clock obtained by dividing the frequency of the basic clock, a counter 37 for executing the count operation (up-count operation in this embodiment) depending on the divided clock generated by the oscillation/frequency-dividing circuit 35, a serial communication unit 39 for making communication with the microcomputer 3, and an output port 41 for outputting the basic clock PS generated by the oscillation/frequency-dividing circuit 35 to the relevant IC 5.

The timer IC 5 has the following functions (A) to (F).

(A) Upon reception of a "counter clear instruction" from the microcomputer 3, the count value of the counter 37 (that is, count value of the timer IC 5, hereinafter referred to as the counter value) is reset to the initial value (zero).

(B) A value Ns compared with the counter value is transmitted from the microcomputer 3 and is then set. The microcomputer 3 sets, as Ns, a value which is smaller than the maximum value which may be counted by the counter 37 (the value before the final value of the counter value).

(C) When the count value reaches Ns set by the microcomputer 3 (counter value becomes equal to Ns), an output level (logical level of the signal line L in FIG. 1) of the power supply activation signal TSW to the drive circuit 15 is held in the high level.

(D) Upon reception of a "TSW clear instruction" from the microcomputer 3, an output level of the power supply activation signal TSW is set to the low level.

(E) The counter value can be read from the microcomputer 3.

(F) A frequency-dividing ratio when the oscillation/frequency-dividing circuit 35 generates the frequency-divided clock from the basic clock PS may be varied depending on a frequency-dividing instruction from the microcomputer 3.

Here, each clear instruction to the timer IC 5 from the microcomputer 3 and Ns can be set from the microcomputer 3 via a serial communication unit 39 of the timer IC 5 from the communication port 31 of the microcomputer 3. Moreover, the counter value is also read in the microcomputer 3 from the timer IC 5 via the communication port 31 of the microcomputer 3 from the serial communication unit 39 of the timer IC 5.

Meanwhile, in this embodiment, the microcomputer 3 starts operation by receiving the power supply voltage Vom from the power supply IC 9, sets the power supply holding signal PI to the drive circuit 15 to the high level and maintains the state where the power supply IC 9 outputs the power supply voltage Vom (namely, the state where the microcomputer 3 can be operated.) When the microcomputer 3 determines that the predetermined operation stop condition is set, it sets the power supply holding signal PI to the low level and thereby stops supply of the power supply voltage Vom from the power supply IC 9 and stops the operation thereof. In this embodiment, the operation stop condition is set when the microcomputer 3 is activated in the timing that the IGSW 11 is turned on (change to the high level of the IGSW signal), in the timing where the necessary processes are completed after the IGSW 11 is turned off. Moreover, when the power supply activation signal TSW from the timer IC 5 becomes in the high level while the IGSW 11 is turned off and thereby the microcomputer 3 is activated, such an operation stop condition is set when the necessary particular processes are completed.

In addition, the microcomputer 3 resets the counter value by transmitting a "counter clear instruction" to the timer IC 5 immediately before it stops the operation thereof (immediately before the power supply holding signal PI is set to the low level). Moreover, the microcomputer 3 transmits a "TSW clear instruction" to the timer IC 5 during the operation thereof to set the power supply activation signal TSW from the timer IC 5 to the low level.

In this embodiment, the timer IC 5 corresponds to the timer circuit, while the power supply IC 7 corresponds to the first power supply circuit, the power supply IC 9 and drive circuit 15 correspond to the second power supply circuit, and the power supply activation signal TSW and power supply holding signal PI correspond to the operation instruction signal.

Next, processes executed by the microcomputer 3 will be explained with reference to the flowcharts of FIG. 2 and FIG. 3.

Figure 2:
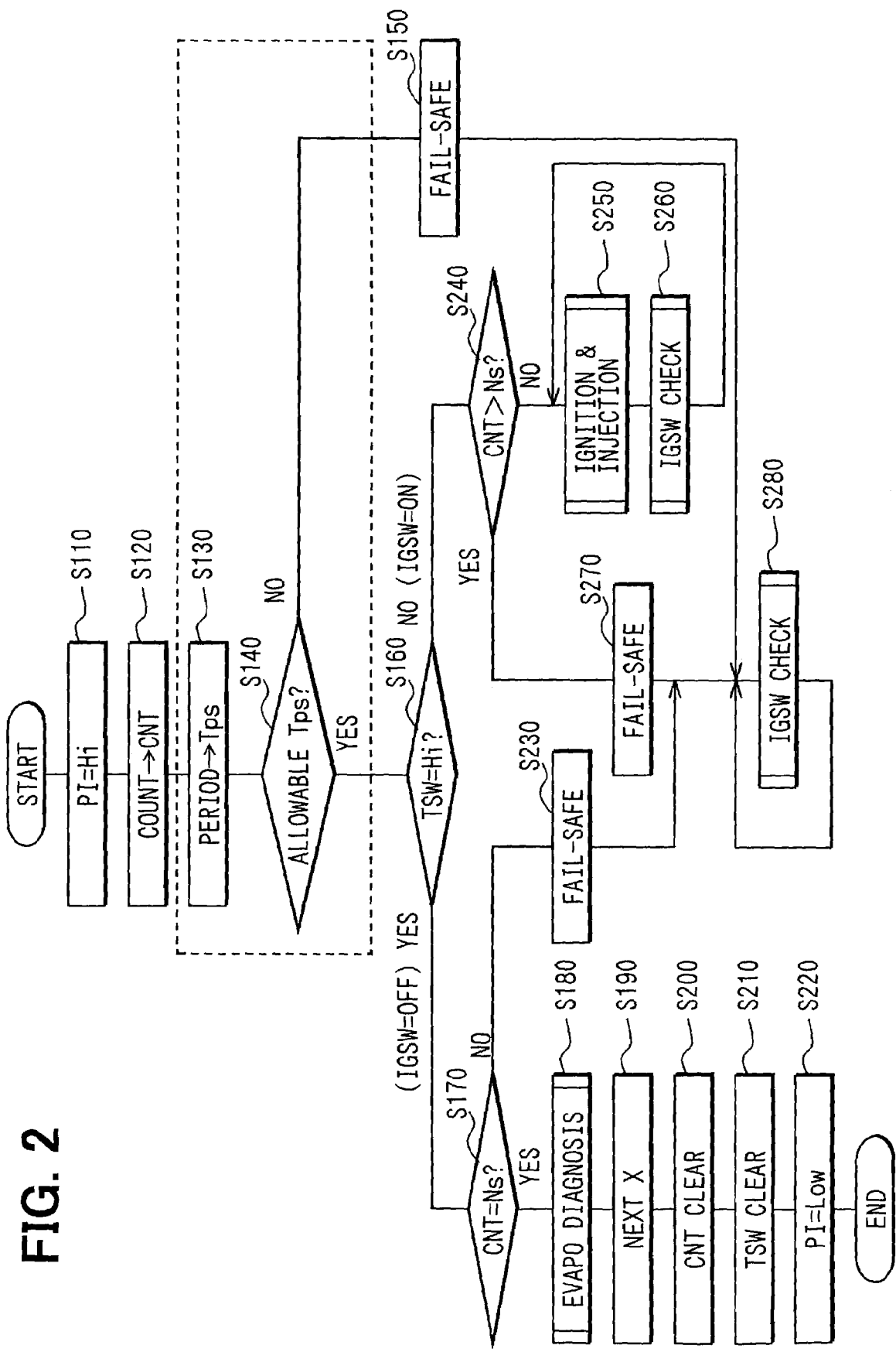
FIG. 2 is a flowchart illustrating the processes executed by a microcomputer of the ECU in the first embodiment.

As illustrated in FIG. 2, when the microcomputer 3 starts operation thereof by receiving the power supply voltage Vom from the power supply IC 9, it sets the power supply holding signal PI to the drive circuit 15 to the high level at S110 to thereby maintain the state where the power supply voltage Vom is outputted from the power supply IC 9. At S120, subsequently, the counter value is read from the timer IC 5 and this counter value is stored in a counter value storage area CNT of the RAM 21. At S130, the period of basic clock PS outputted from the timer IC 5 is measured and the result thereof is stored in a period storage area Tps of the RAM 21.

In the subsequent S140, a value of the period storage area Tps (namely, the period of the basic clock PS measured at S130) is determined whether it is in the range of specification, namely in the allowable range or not. The specified range is set to the range up to the maximum value from the minimum value of the normal period of the basic clock PS. When the value of period storage area Tps is determined not to be in the specified range at S140, the process proceeds to S150.

At S150, the predetermined fail-safe process is executed upon the determination that the oscillator 33 or the oscillation/frequency-dividing circuit 35 in the timer IC 5 is defective and the timer IC 5 (counter 37 in detail) cannot continue the normal counting operation. Thereafter, the process advances to S280 to repeat the IGSW check process. The fail-safe process to be executed at S150 means the process to store the occurrence of a failure and diagnosis information indicating contents of this failure in the non-volatile memory explained above.

In addition, when the value of period storage area Tps is determined to be in the specified range at S140, the process proceeds to S160. In this S160, in order to determine whether the present activation is executed from the IGSW signal VG or the timer IC 5, the logical level of signal line L of power supply activation signal TSW to the drive circuit 15 from the timer IC 5 is read to determine whether the power supply activation signal TSW from the timer IC 5 is in the high level or not.

When the power supply activation signal TSW is determined to be in the high level at S160, the present activation is determined to be executed by the timer IC 5 (namely, it is activated by change of the power supply activation signal TSW from the timer IC 5 to the high level and not by turning on of the IGSW signal 11) and the process advances to S170.

At S170, it is determined whether the value of counter value storage area CNT (namely, the counter value CNT read from the timer IC 5 at S120) matches Ns which is set in current for the timer IC 5. That is, it is determined that the counter value when driven by the microcomputer 3 actually reaches the value Ns or not.

When CNT=Ns is acknowledged at S170, the process advances to S S180, upon determination that the timer IC 5 operates normally to execute the diagnostic process of the evaporative gas purge system (evaporative gas diagnostic process). This evaporative gas diagnostic process has the contents, as explained above, that a system of the engine for collecting the evaporated fuel from a fuel tank is closed for pressurization or reduction of pressure and the air-tightness of the relevant system is tested by detecting change of pressure in the system.

When the evaporative gas diagnostic process is terminated at S180, the next Ns is transmitted to the timer IC 5 and is then set at S190. In the subsequent S200, a "counter clear instruction" is transmitted to the timer IC 5 to reset the counter value. Then, at S210, a "TSW clear instruction" is transmitted to the timer IC 5 to set the power supply activation signal TSW from the timer IC 5 to the low level. Next, at S220, the power supply holding signal PI to the drive circuit 15 is returned to the low level. Thereby, supply of the power supply voltage Vom from the power supply IC 9 is stopped and therefore the microcomputer 3 stops the operation thereof.

When it is determined at S170 that CNT does not equal Ns (the counter value does not reach Ns), the process advances to S230. In this S230, the fail-safe process is executed upon determination that the signal line L of the power supply activation signal TSW to the drive circuit 15 from the timer IC 5 is shorted to the high level side. Thereafter the process advances to S280 to repeat the IGSW check process explained later. The fail-safe process is that occurrence of failure and diagnosis information indicating the contents of failure are stored in the non-volatile memory explained above and likelihood of exhaustion of battery is informed to a driver of vehicle. Namely, in this case, even when the counter value of the timer IC 5 does not yet reach Ns, the microcomputer 3 is determined to be activated because the signal line L of the power supply activation signal TSW is shorted to the high level side. Thereafter, the output of power supply voltage Vom from the power supply IC 9 cannot be stopped, bringing about a possibility for exhaustion of battery.

When it is assumed that the count period of timer IC 5 is short (frequency of the divided clock to the counter 37 from the oscillation/frequency-dividing circuit 35 is high) and the counter value progresses during a delay time until the microcomputer 3 executes the process of S120 after the counter value reaches Ns, this problem can be eliminated by designing the apparatus to determine whether "Ns≦CNT≦Ns+α" is satisfied or not at S170. The value α may be determined depending on an increment of the counter value assumed to progress from Ns within the delay time explained above.

Meanwhile, when the power supply activation signal TSW is determined not to be in the high level (in the low level) at S160, the process advances to S240 upon determination that the present activation is executed by the IGSW signal VG (namely, activated because the IGSW is turned on and the IGSW signal VG has changed to the high level). At S240, it is determined whether CNT is larger than Ns which is set at present for the timer IC 5 or not. That is, it is determined whether the counter value when the microcomputer 3 is activated has exceeded Ns or not.

When CNT is determined not to be larger than Ns at S240, the process advances to S250 to execute the ignition control process and fuel injection control for the engine. Moreover, in the subsequent S260, the IGSW check process explained later is executed. Thereafter, the processes of S250 and S260 are repeated. On the other hand, when the CNT is determined to be larger than NS (exceeding Ns) at S240, the process advances to S270. In this S270, the fail-safe process is executed upon determination that a failure for disabling activation of the power supply IC 9 (failure that the power supply IC 9 cannot provide the power supply voltage Vom) is generated in the timer IC 5.

Namely, when the result of determination is affirmative at S240, it is assumed that even when the counter value of the timer IC 5 reaches Ns, the power supply IC 9 cannot output the power supply voltage Vom because the signal line L of the power supply activation signal TSW to the drive circuit 15 from the timer IC 5 is broken or is shorted to the low level side and thereafter the microcomputer 3 is activated because the IGSW 11 is turned on. Thereafter, the process advances to S280 to repeat the IGSW check process explained later.

The fail-safe process to be executed at S270 is that occurrence of failure and diagnosis information indicating the contents of the failure are stored in the non-volatile memory explained above. Moreover, when the result of determination at S240 is affirmative, it is assumed that the microcomputer 3 can no longer be activated with the timer IC 5. Therefore, in this case, it is possible that the subsequent evaporative gas diagnostic process is suspended or if the evaporative gas diagnostic process is surely necessary, it is executed after the predetermined time has passed, even when the IGSW 11 is turned off, by continuously outputting the high level power supply holding signal PI from the microcomputer 3 to continuously operate the microcomputer 3.

Meanwhile, at S160, it is also allowed to determine whether the present activation is executed by the IGSW signal VG or the timer IC 5 from the logical level of the IGSW signal VG. That is, in this case, when the IGSW signal is in the low level, the process advances to S170, while it is in the high level, the process advances to S240.

Moreover, when such change is conducted, it is also possible, at S240, to determine whether the CNT is larger than the predetermined determination value Nh which is set to the value larger than Ns (value closer to the final value of the counter value than Ns) in place of determining whether the CNT is larger than Ns or not. That is, for example, when it is likely that the timing when the IGSW 11 is turned on is almost equal to the timing when the counter value of the timer IC 5 reaches Ns and moreover the counter value progresses during the delay time until the microcomputer 3 is activated to read the counter value (until the process of S120 is executed), if it is determined that the CNT is larger than Ns (CNT>Ns) at S240, this process is accompanied by the possibility of erroneous determination of a failure. Such an erroneous determination can be avoided by forming the apparatus to determine whether the CNT is larger than determination value Nh (>Ns) or not.

Moreover, as illustrated in FIG. 2, it is also possible to provide the structure that when the power supply activation signal TSW from the timer IC 5 is determined to be in the low level at S160 and the process advances to S240, "CNT≧Ns" or not is determined at S240 and when the result is YES, the process advances to S270. That is, when it is confirmed that the power supply activation signal TSW from the timer IC 5 is in the low level at S160, the counter value read from the timer IC 5 in the preceding S120 must be less than Ns when it is normal. In the case of this modification, the processes of S160 and S240 correspond to the determination process, while the affirmative result of S240 corresponds to the affirmative result in the determination. Moreover, when this modification is employed, the maximum countable value of the counter 37 may be set as Ns of the timer IC 5.

Next, the IGSW check process to be executed at S260 and S280 of FIG. 2 will be explained with reference to FIG. 3.

Figure 3:
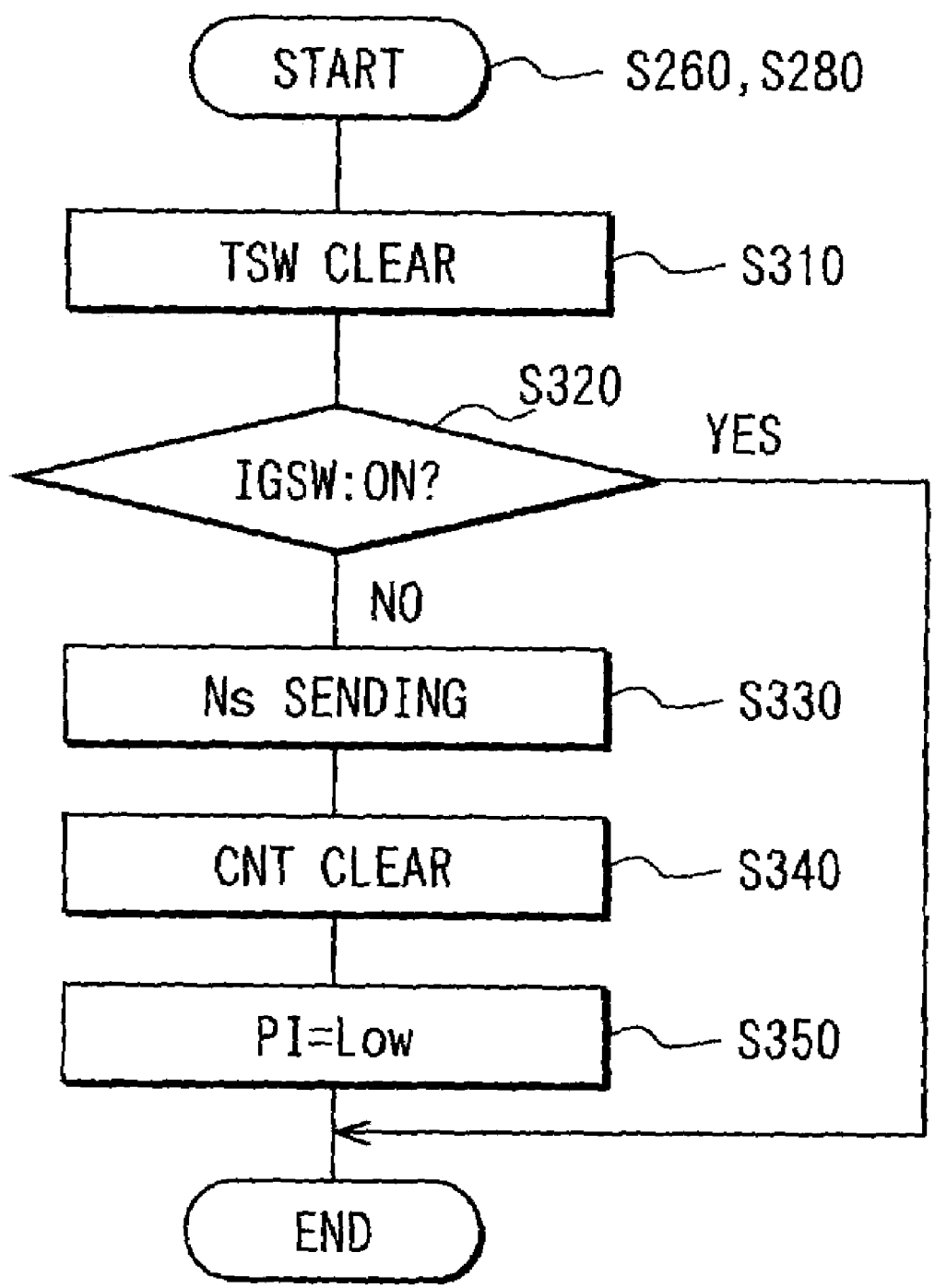
FIG. 3 is a flowchart illustrating the ignition switch of vehicle (IGSW) check process executed in the processes of FIG. 2.

As illustrated in FIG. 3, when the IGSW check process is started, a "TSW clear instruction" is transmitted to the timer IC 5 at S310, to set the power supply activation signal TSW from the timer IC 5 to the low level.

In the next S320, it is determined whether the IGSW 11 is turned on based on the logical level of the IGSW signal VG. When it is determined that the IGSW 11 is turned on at S320, the IGSW check process is terminated here but when it is determined that the IGSW 11 is not turned on (being OFF), the process advances to S330.

At S330, Ns is transmitted to the timer IC 5 and is then set therein. In the subsequent S340, a "counter clear instruction" is transmitted to the timer IC 5 to reset the counter value. Thereafter, at S350, the power supply holding signal PI to the drive circuit 15 is reset to the low level. Thereby, supply of the power supply voltage Vom from the power supply IC 9 is stopped and the microcomputer 3 also stops the operation thereof.

Figure 4:
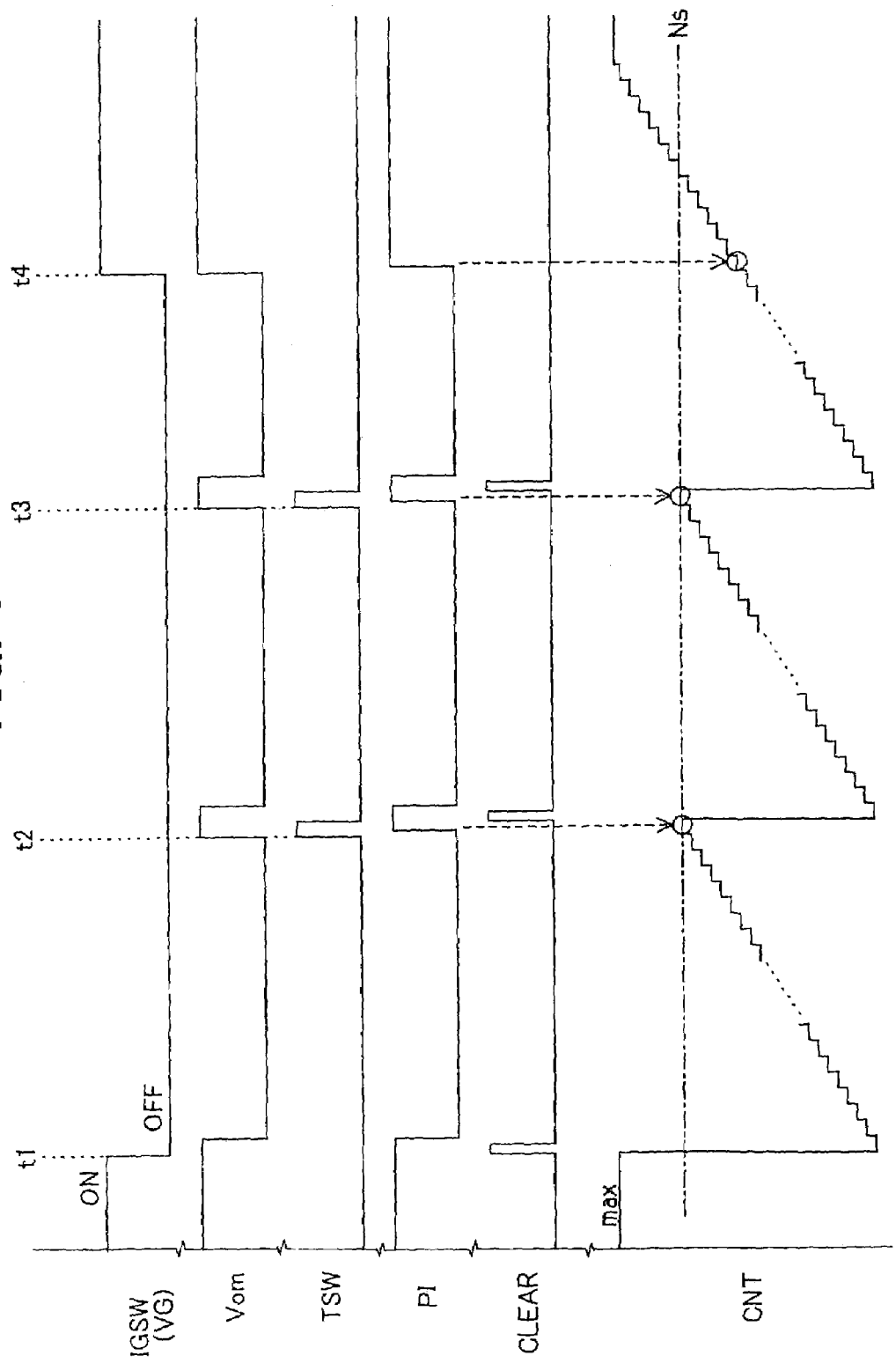
FIG. 4 is a time chart illustrating normal operation of the ECU of the first embodiment.
Figure 5:
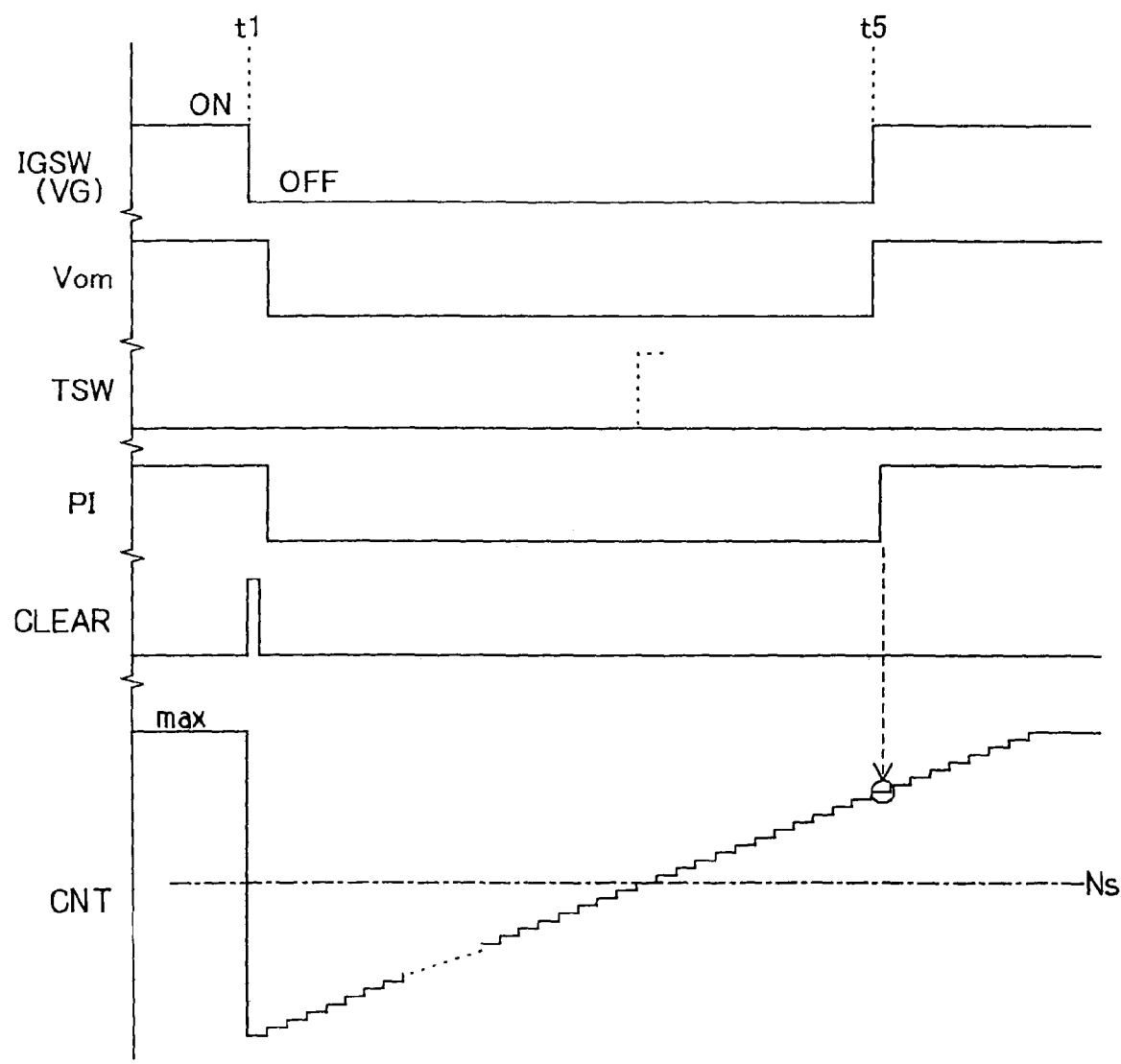
FIG. 5 is a time chart illustrating defective operation of the ECU of the first embodiment.

Next, the operations of ECU 1 of the first embodiment will be explained using the time charts of FIG. 4 and FIG. 5. FIG. 4 illustrates the normal operation, while FIG. 5 illustrates operations when a failure has occurred.

First, normal operation will be explained with reference to FIG. 4.

As illustrated in the left part of time t1 in FIG. 4, while the IGSW 11 is held turned on, the IGSW signal VG is in the high level. Therefore, the microcomputer 3 is operated by the power supply voltage Vom from the power supply IC 9. This microcomputer 3 repeats the processes of S250 and S260 of FIG. 2. Thereby, the microcomputer 3 executes the ignition control and fuel injection control for the engine. Under this condition, the power supply activation signal TSW from the timer IC 5 is set to the low level at S310 of the IGSW check process which is executed by the microprocessor 3 at S260 of FIG. 2.

Thereafter, if the IGSW 11 is turned off at time t1 in FIG. 4, the microcomputer 3 sets Ns corresponding to the predetermined specified time Ts to the timer IC 5 (S330) at S330 to S350 of the IGSW check process to be executed at S260 of FIG. 2, also resets the counter value of the timer IC 5 to zero (S340) and finally sets the power supply holding signal PI to the low level (S350). Thus, the power supply IC 9 does not output the power supply voltage Vom and therefore the microcomputer 3 also stops the operation thereof. In this example, the specified time Ts is a waiting time until the microcomputer 3 is activated again to execute the evaporative gas diagnostic process after it has once stopped the operation thereof. When the IGSW 11 is turned off and the microcomputer 3 stops the operation, the timer IC 5 controls the counter 37 to start the count operation from the initial value.

Thereafter, when the specified time TS has passed and the counter value of timer IC 5 reaches Ns, the power supply activation signal TSW to the drive circuit 15 from the timer IC 5 becomes the high level at time t2. Thereby, the power supply IC 9 outputs the power supply voltage Vom. Accordingly, the microcomputer 3 starts the operation to assure the supply of the power supply voltage Vom by setting the power supply holding signal PI to the high level at S110 of FIG. 2. Under the normal operation, the microcomputer 3 determines that the power supply activation signal TSW from the timer IC 5 is in the high level at S160 and also determines at S170 that the CNT matches Ns. Moreover, the microcomputer 3 executes the evaporative gas diagnostic process at S180 of FIG. 2, thereafter sets (S190) Ns corresponding to the next specified time Ts to the timer IC 5 in the subsequent S S190 to S220, resets (S200) the counter value in the timer IC 5 to zero and moreover resets (S210) the power supply activation signal TSW from the timer IC 5 to the low level to also finally set (S220) the power supply holding signal PI to the low level. Thereby, the power supply IC 9 does not output the power supply voltage Vom and the microcomputer 3 stops again the operation thereof.

When the microcomputer 3 stops the operation as explained above, the counter 37 of timer IC 5 starts again the count operation from the initial value. Thereafter, when the specified time Ts has passed and the counter value of timer IC 5 reaches Ns, the power supply activation signal TSW from the timer IC 5 becomes in the high level as illustrated at time t3 and the power supply IC 9 outputs the power supply voltage Vom.

Thus, the microcomputer 3 operates in the same way as in the case where the power supply activation signal TSW becomes the high level at time t2, executes the processes of S S170 to S210 of FIG. 2 to set the power supply holding signal PI to the low level at S220 and terminates again the operation thereof. When the microcomputer stops the operation, the counter 37 of timer IC 5 also starts again the count operation from the initial value.

Thereafter, it is assumed that the IGSW 11 is turned on at time t4 before the counter value reaches Ns. In this case, the power supply IC 9 is operated by the IGSW signal VG to output the power supply voltage Vom. Thereby the microcomputer 3 starts the operation and assures supply of the power supply voltage Vom by setting the power supply holding signal PI to the high level at S110 of FIG. 2. In this case, the microcomputer 3 determines the power supply activation signal TSW from the timer IC 5 is in the low level at S160 of FIG. 2 and also determines the CNT does not exceed Ns at S240. Thereafter, the microcomputer 3 executes the ignition control and fuel injection control for the engine by repeating the processes of S S250 and S260.

On the other hand, it is assumed that a failure for disabling activation of the power supply IC 9 is generated in the timer IC 5 (for example, breaking or shorting to the low level side of the signal line L, or failure of output port for power supply activation signal TSW of timer IC 5 or the like). If such failure is generated, even when the specified time Ts has passed after the IGSW 11 is turned off at time t1 and the counter value of timer IC 5 reaches Ns, the high level power supply activation signal TSW is not inputted to the drive circuit 15 and the power supply voltage Vom remains at 0[V]. As a result, the microcomputer 3 remains in the non-operated condition.

Thereafter, the IGSW 11 is turned on at time t5 and the microcomputer 3 starts its operation. Here, the microcomputer 3 determines that the power supply activation signal TSW is in the low level at S160 of FIG. 2 to execute determination at S240. In this case, when the microcomputer 3 is activated and executes the process of S120 of FIG. 2, the counter value of timer IC 5 has already exceeded Ns. Therefore, the microcomputer 3 determines at S240 that the CNT has exceeded Ns. Thus, the microcomputer 3 determines at S270 of FIG. 2 that a failure which disables activation of the power supply IC 9 is generated.

According to the ECU 1 of the first embodiment as explained above, occurrence in the timer IC 5 of the failure which disables activation of the power supply IC 9 can surely be detected without addition of a particular circuit. Moreover, since the microcomputer 3 executes determination, with the process at S160, at S 240 upon the determination (S160: NO) that the present activation is executed with the IGSW signal VG, efficiency of the process can be assured.

Moreover, the microcomputer 3 determines that the timer IC 5 (particularly, the oscillator 33 or oscillation/frequency-dividing circuit as the clock source) is defective (S150) if the measured value is not within the specified range by measuring (S130) the period of the basic clock PS outputted from the timer IC 5. Therefore, a failure which disables accurate counting of the timer IC 5 can be detected reliably.

Moreover, in the ECU 1 of the first embodiment, when the microcomputer 3 starts the operation by receiving the power supply voltage Vom and determines that it has been activated because the power supply activation signal TSW from the timer IC 5 becomes the high level (S160: YES), the microcomputer 3 determines (S170) whether the counter value of the timer IC 5 reaches Ns. If the counter value does not reach Ns (S170: NO), the microcomputer 3 determines (S230) that the signal line L of the power supply activation signal TSW to the drive circuit 15 from the timer IC 5 is shorted to the high level side. Therefore, likelihood of exhaustion of battery can be informed to a vehicle driver by surely detecting such failure.

(Second Embodiment)

Figure 6:
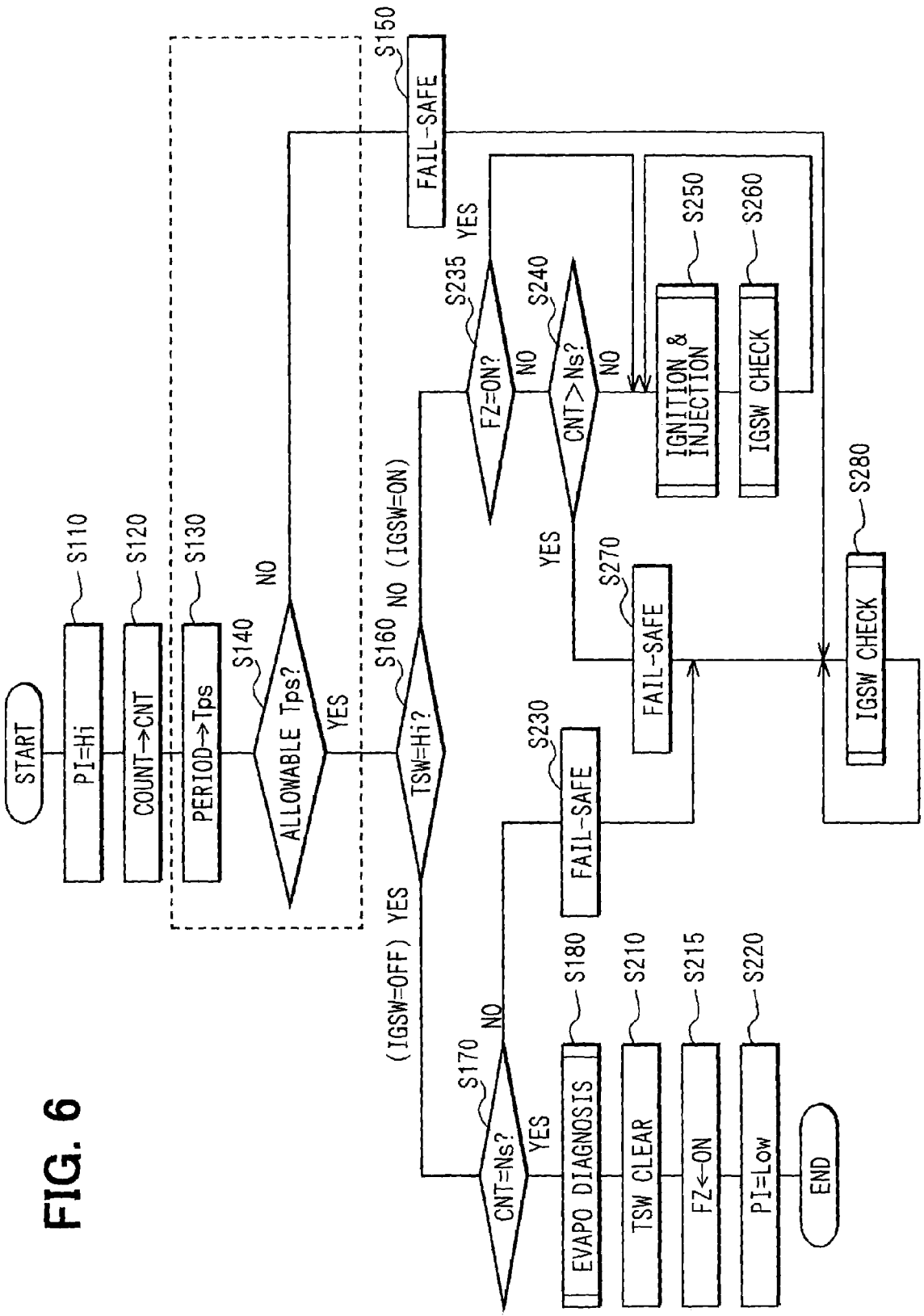
FIG. 6 is a flowchart illustrating the processes to be executed by the microcomputer of the ECU as a second embodiment.
Figure 7:
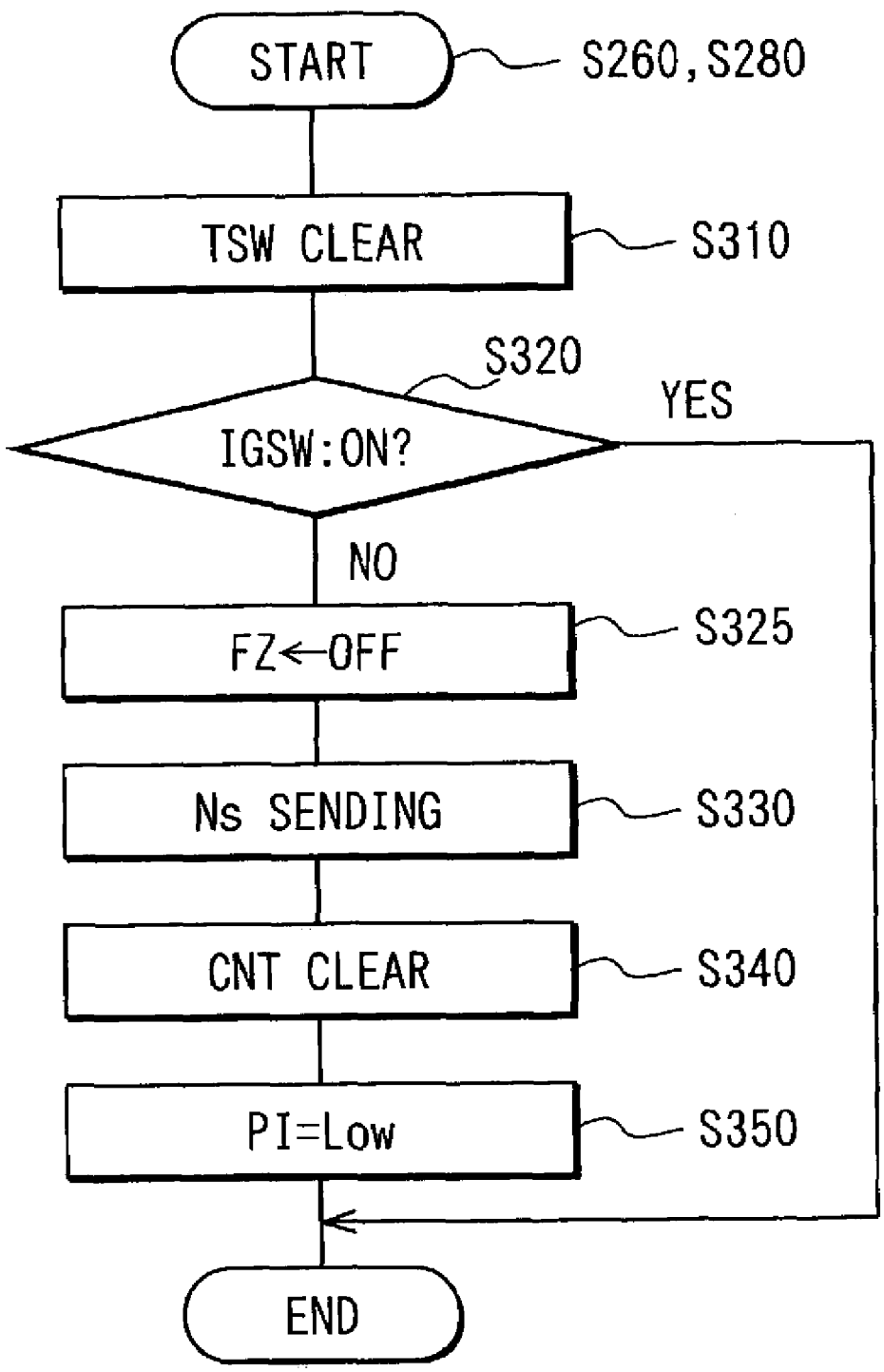
FIG. 7 is a flowchart illustrating the IGSW process executed in the processes of FIG. 6.

The ECU of the second embodiment is exactly identical in the hardware structure, except for contents of processes to be executed by the microcomputer 3. In this second embodiment, the microcomputer 3 executes the process of FIG. 6 in place of that of FIG. 2 and also executes the IGSW check process of FIG. 7 in place of that of FIG. 3. In FIG. 6 and FIG. 7, the processes identical to that of the first embodiment (FIGS. 2 and 3) are given the like step numbers and detailed explanation is avoided. The process of FIG. 6 is different from that of FIG. 2 in the following points (1) to (3).

(1) Processes at S190 and S200 are not provided.

(2) The process of S215 is provided between S S S210 and S220. After a "TSW clear instruction" is transmitted to the timer IC 5 at S210, the processed flag FZ is set at S215 (that is, the processed flag FZ is turned on). Thereafter, the power supply holding signal PI to the drive circuit 15 is returned to the low level at S220. Here, the processed flag FZ indicates that the microcomputer 3 is activated with the timer IC 5 while the IGSW 11 is OFF and is stored in the non-volatile memory explained above.

(3) The process of S235 is provided between S S S160 and S240. In this second embodiment, when it is determined at S160 that the power supply activation signal TSW is not in the high level and the present activation is caused by the IGSW signal VG, the process advances to S235 to determine whether the processed flag FZ is set or not. When the processed flag FZ is not set, the process advances to S240. When the processed flag FZ is set, the process proceeds to S250.

On the other hand, the IGSW check process of FIG. 7 is different from that of FIG. 3 only in the point that the process S325 is added between S S320 and S330. When it is determined that the IGSW 11 is not turned on at S320 during the IGSW check process of FIG. 7, the process proceeds to S325 to reset the processed flag FZ (that is, the processed flag FZ is turned off). Thereafter, the process advances to S330. The IGSW check process of FIG. 7 is executed at S260 and S280 of FIG. 6.

Figure 8:
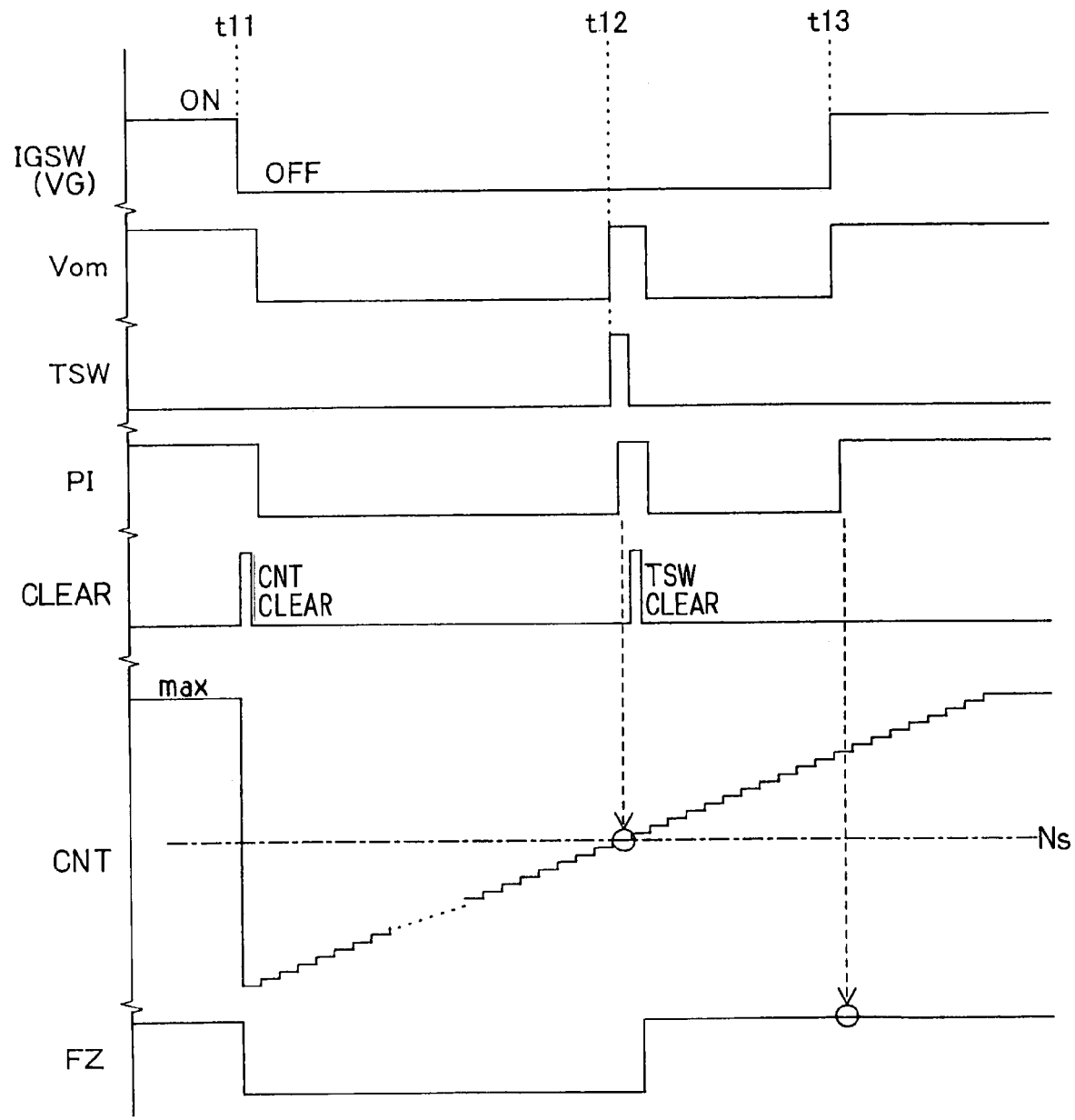
FIG. 8 is a time chart illustrating the normal operation when the OFF time of IGSW is longer than a specified time of a timer IC in the ECU of the second embodiment.
Figure 9:
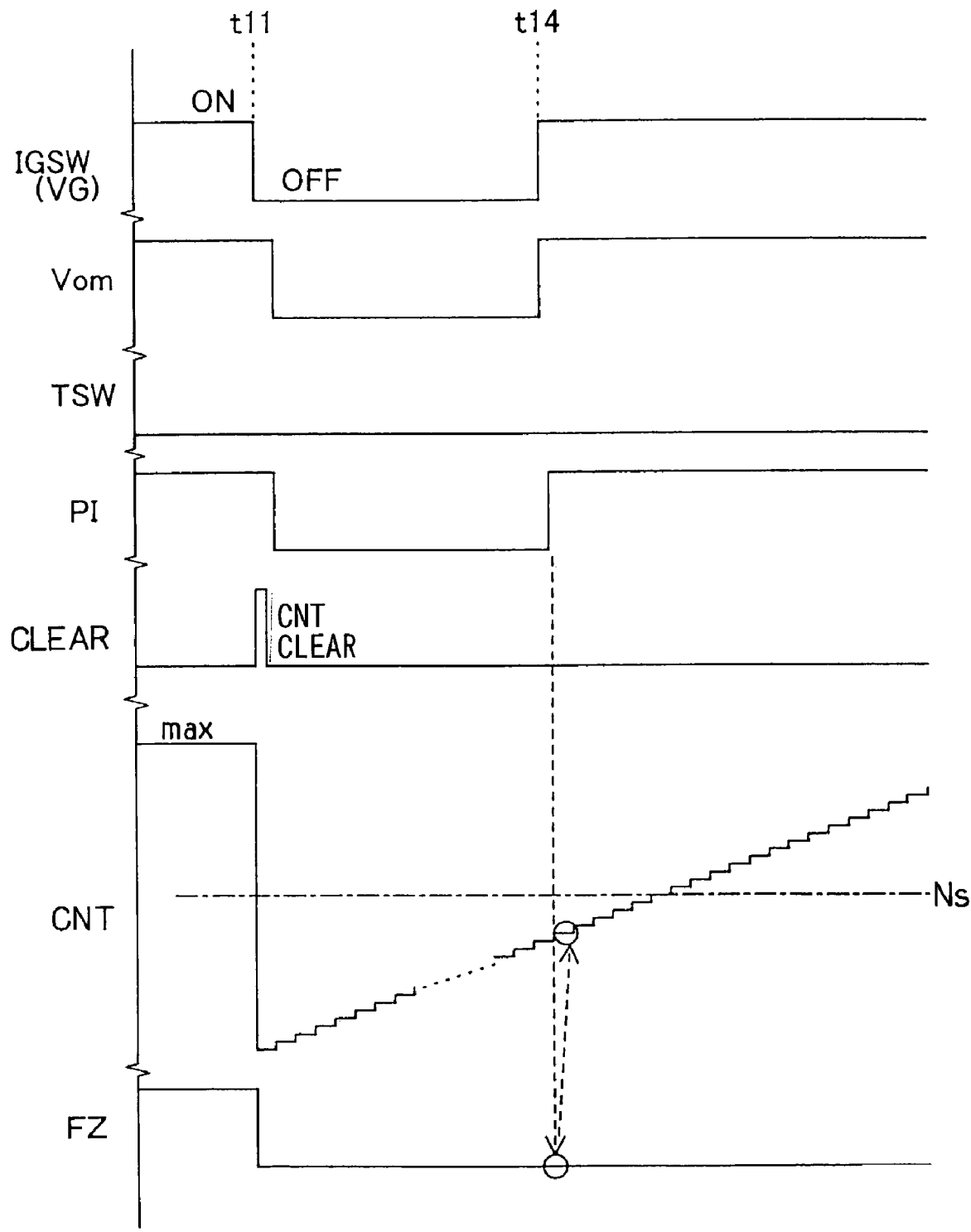
FIG. 9 is a time chart illustrating the normal operation when the OFF time of IGSW is shorter than the specified time of the timer IC in the ECU of the second embodiment.
Figure 10:
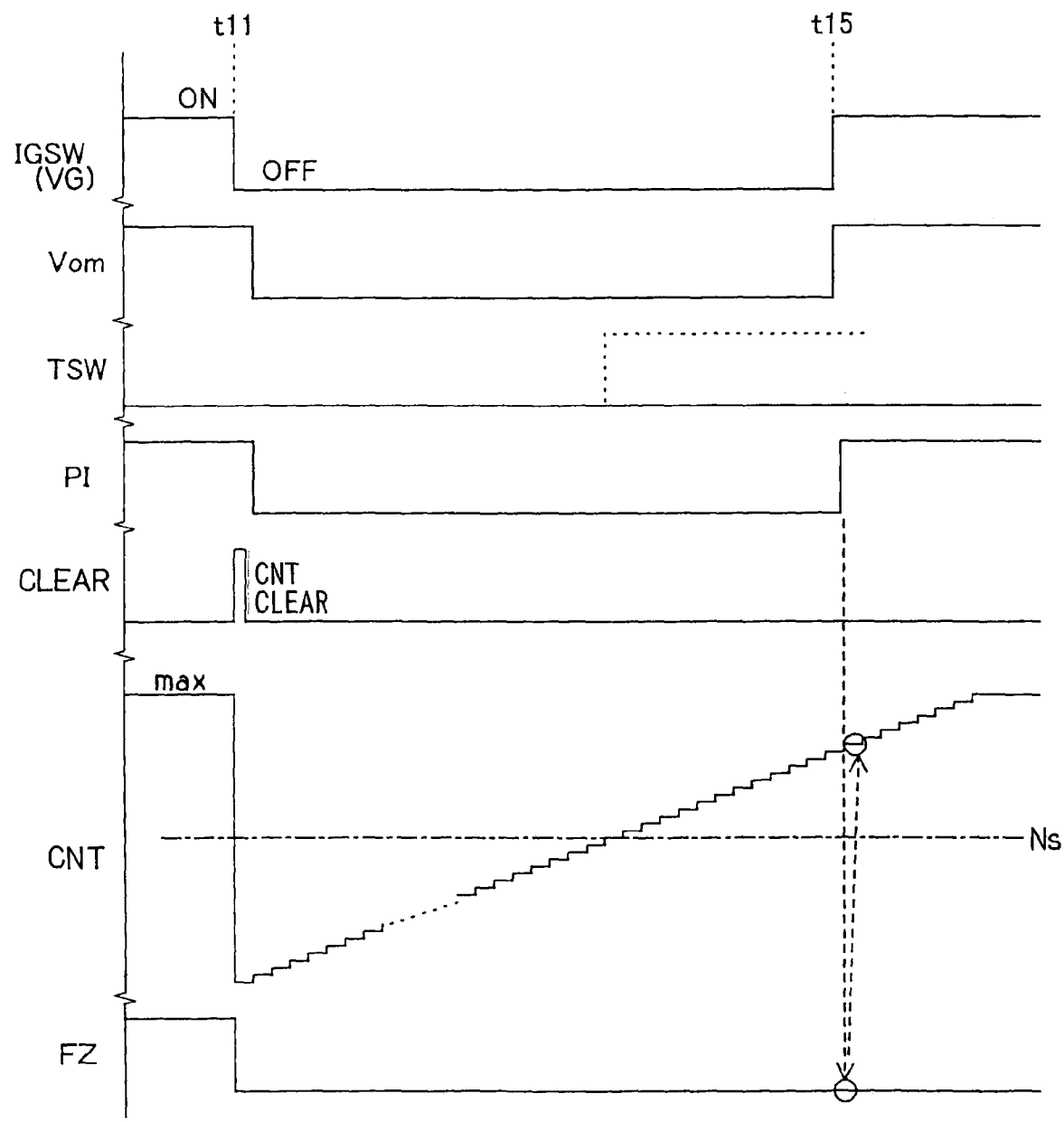
FIG. 10 is a time chart illustrating defective operation in the ECU of the second embodiment.

Next, operations of the ECU 1 of the second embodiment explained above will be explained mainly with respect to the difference from the first embodiment with reference to the time charts of FIG. 8 to FIG. 10. FIG. 8 illustrates the normal operation when the OFF time (duration of OFF state) of the IGSW 11 is longer than the specified time Ts of the timer IC 5, while FIG. 9 illustrates the normal operation when the OFF time of the IGSW 11 is shorter than the specified time Ts of the timer IC 5 and FIG. 10 illustrates defective operation.

First, as illustrated in the left part of time t11 in FIG. 8, while the IGSW 11 is turned on, the microcomputer 3 operates exactly same as that of the first embodiment. At time t11 in FIG. 8, if the IGSW 11 is turned off, the microcomputer 3 rests with the processed flag FZ (S325) with the IGSW check process of FIG. 7 to be executed at S260 of FIG. 6. Thereafter, Ns corresponding to the predetermined specified time Ts is set to the timer IC 5 (S330) as in the case of the first embodiment and to reset the counter value of the timer IC 5 to zero (S340) and also finally set the power supply holding signal PI to the low level (S350). Thereby, the power supply IC 9 does not output the power supply voltage Vom and the microcomputer 3 also stops the operation thereof. Here, the counter 37 in the timer IC 5 starts the count operation from the initial value.

Thereafter, when the specified time Ts has passed leaving the IGSW 11 in the OFF state and the counter value of the timer IC 5 reaches Ns, the power supply activation signal TSW from the timer IC 5 also becomes the high level at time t12 of FIG. 8 in the second embodiment, the power supply IC 9 outputs the power supply voltage Vom and the microcomputer 3 starts the operation thereof to set the power supply holding signal PI to the high level (S110).

In the normal operation of FIG. 8, the microcomputer 3 executes the processes at S160, S170 and S180 of FIG. 6 and thereafter sets only the power supply activation signal TSW from the timer IC 5 without resetting the counter value of the timer IC 5 (S210), moreover sets the processed flag FZ (S215) and finally sets the power supply holding signal PI to the low level (S220).

Thus, the power supply IC 9 does not output the power supply voltage Vom and the microcomputer 3 stops again the operation thereof. In this timing, the processed flag FZ in the non-volatile memory is set. Moreover, in the IC 5, even when the counter value reaches Ns, it is not reset and the counting operation is continued.

Thereafter, as illustrated in FIG. 8, it is assumed that the IGSW 11 is turned on at time t13 before the counter value reaches the maximum value. The power supply IC 9 outputs the power supply voltage Vom by means of the IGSW signal VG and the microcomputer 3 starts the operation thereof and holds, also in this case, the supply of the power supply voltage Vom by setting the power supply holding signal PI to the high level at S110 of FIG. 6.

In this case, the microcomputer 3 determines at S160 of FIG. 6 that the power supply activation signal TSW from the timer IC 5 is in the low level to execute the determination process of S235. In this timing, the processed flag FZ is being set. Therefore, the microcomputer 3 determines at S235 that the processed flag FZ is being set. As a result, if the CNT has exceeded Ns, the microcomputer 3 repeats subsequently the processes of S250 and S260 to execute the ignition control and fuel injection control for the engine.

In addition, as illustrated in FIG. 9, it is assumed here that the IGSW 11 is turned off at time t11, thereafter the IGSW 11 is turned on at time t14 before the counter value of the timer IC 5 reaches Ns (that is, before the specified time Ts has passed). In this case, the microcomputer 3 determines the process of S235 of FIG. 6 as in the case where the IGSW 11 is turned on at time t13 of FIG. 8. In this timing, however, the processed flag FZ is not yet set. Therefore the microcomputer FZ determines at S235 that the processed flag FZ is not yet set to execute the determination process of S240. In this case, since the CNT is smaller than Ns, the microcomputer 3 subsequently repeats the processes of S250 and S260.

Meanwhile, here it is assumed that a failure which disables activation of the power supply IC 9 is generated in the timer IC 5. In this case, even when the counter value of timer IC 5 reaches Ns after the specified time Ts has passed from the timing where the IGSW 11 is turned off at time t11, the high level power supply activation signal TSW is not inputted to the drive circuit 15 and the power supply voltage Vom remains at 0[V]. As a result, the microcomputer 3 is being placed in the non-operated condition.

Thereafter, when the IGSW 11 is turned on at time t15 and the microcomputer 3 starts operation thereof, it determines at S160 of FIG. 2 that the power supply activation signal TSW is in the low level to execute the determination process of S235. In this case, since the processed flag FZ is being reset, the determination process of S240 is executed. Thereby, the microcomputer 3 is activated and executes the process of S120. In this timing, since the counter value of the timer IC 5 has exceeded Ns, the microcomputer 3 determines at S240 that the CNT has exceeded Ns. Accordingly, the microcomputer 3 determines at S270 of FIG. 6 that a failure which disables activation of the power supply IC 9 is generated in the timer IC 5.

According to the ECU 1 of the second embodiment, the counter value in the timer IC 5 is reset when the IGSW 11 is OFF and thereafter if the counter value reaches Ns, the counter value is never reset and is counted continuously. When the microcomputer 3 determines at S160 to execute the activation cause determination process that the present activation is executed by the IGSW signal VG, it can detect the OFF time of the IGSW 11 by reading the counter value from the timer IC 5 or from the counter value (CNT) read at S120.

Particularly when the microcomputer 3 determines, in the second embodiment, that the present activation is caused by the timer IC 5 from the process of S160 (S160: YES), it sets the processed flag FZ (S215). When it determines that the present activation is caused by the IGSW signal VG with the process of S160 (S160: NO), it determines whether the processed flag FZ is set or not (S235). When the processed flag FZ is being set (S235: YES), the microcomputer does not determine that a failure does not occur in the processes of S240 and S270.

Therefore, as illustrated in FIG. 8, since the IGSW 11 is turned off, the microcomputer 3 is once activated with the timer IC 5 after it has stopped the operation thereof. Thereafter, when the IGSW 11 is turned on, the counter value of the timer IC 5 has exceeded Ns. In this case, the microcomputer 3 does not erroneously determine that a failure occurs in the function of the timer IC 5.

Accordingly, according to the ECU 1 of the second embodiment, the timer IC 5 can be ready for realization of the functions of (1), (2) explained above and detection of occurrence of a failure which disables activation of the power supply IC 9.

In FIG. 6, the determination of S235 is executed before S240, but it is also allowable that when the affirmative result is attained at S240, the determination process is executed at S235 and the process proceeds to S250 when it is determined at S235 that the processed flag FZ is being set.

(Third Embodiment)

Figure 11:
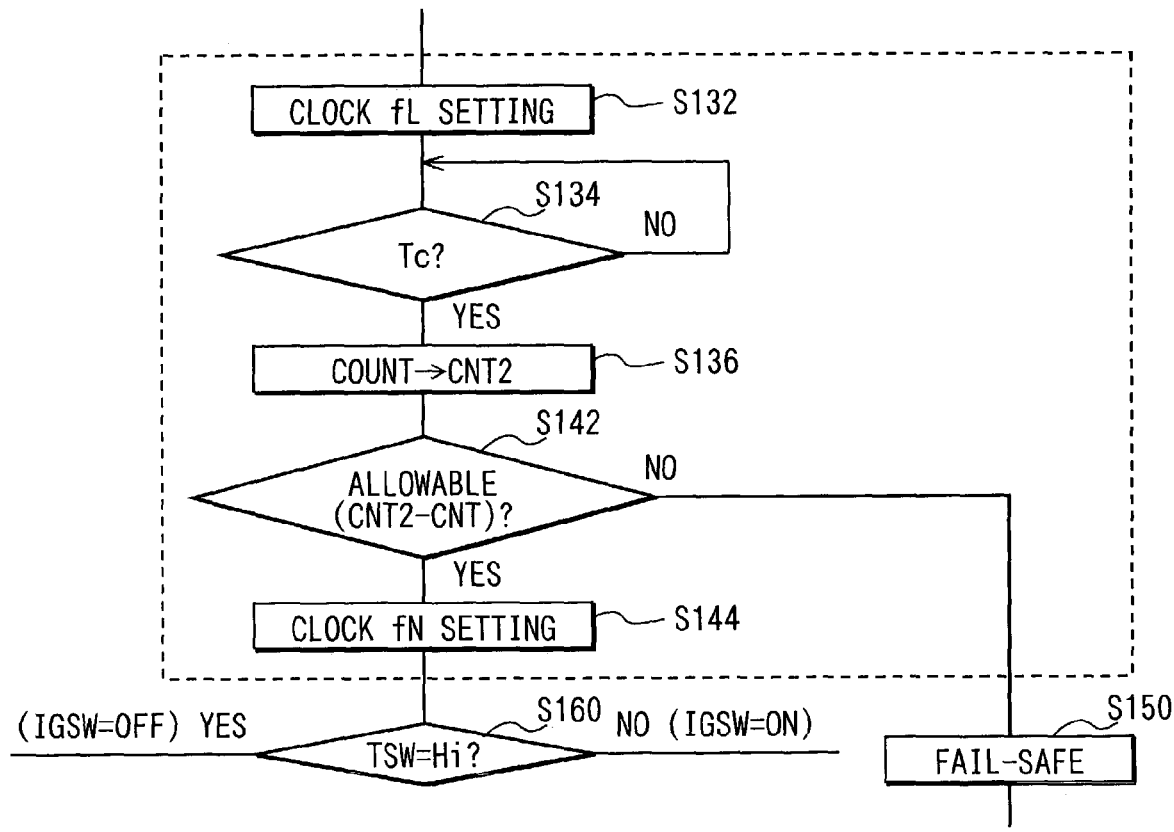
FIG. 11 is a flowchart illustrating a part of the processes executed by the microcomputer of the ECU in a third embodiment.

In the ECU 1 of the third embodiment, the microcomputer 3 executes the processes enclosed in the dotted line box of FIG. 11, in place of the processes of S130 and S140 enclosed in the dotted line box of FIG. 2 or FIG. 6.

That is, after execution of the process at S120, the microcomputer 3 sets the clock frequency of the timer IC 5 to the value higher than the usual value at S132. Practically, the microcomputer 3 updates, depending on a frequency-dividing instruction to the timer IC 5 explained above (F), the frequency-divided clock to the counter 37 from the oscillation/frequency-dividing circuit 35 to the clock frequency which is higher than the usual frequency.

In the subsequent S134, the microcomputer 3 waits for passage of the predetermined constant period Tw and reads, when the constant period Tw has passed, the counter value from the timer IC 5 at S136 and then stores the obtained counter value in the second counter value storage area CNT2 in the RAM 21. The value of this second counter value storage area CNT2 (namely, the counter value obtained from the timer IC 5 at S136) is defined as the CNT2.

Upon completion of the process at S136, it is determined at S142 that a value of "CNT2−CNT" (difference between the counter value read from the timer IC 5 at S136 and the counter value read from the timer IC 5 at S120) is within the predetermined range (allowable range) or not. This predetermined range means a range of the normal increment of the counter value which is assumed to increase during the period up to the process timing of S136 from the process timing of S120.

Here, when the value of "CNT2−CNT" is determined to be not in the predetermined range, the process advances to S150. Like the first and second embodiments, it is determined at S150 that a failure occurs in the oscillator 33 or the oscillation/frequency-dividing circuit 35 in the timer IC 5 and thereby the timer IC 5 cannot continue the correct counting operation and the predetermined fail-safe process is executed.

Moreover, when the value of "CNT2−CNT" is determined to be in the predetermined range at S142, the process advances to S144. The clock frequency of the timer IC 5 (frequency-divided clock frequency to the counter 37 from the oscillation/frequency-dividing circuit 35) is returned to the usual frequency and thereafter the process proceeds to S160.

Thus, in this third embodiment, the microcomputer 3 reads the counter value from the timer IC 5 to execute the determination process to determine whether the counter value changes normally or not (S120, S134 to S142). This determination process determines that the counter value of the timer IC 5 does not vary normally (S142: NO), occurrence of a failure in the timer IC 5 is determined (S150).

With the ECU 1 of this third embodiment, occurrence of a failure which disables normal counting operation of the timer IC 5 can be detected reliably. Moreover, the microcomputer 3 varies the clock frequency of the timer IC 5 to a value which is higher than the usual value at S132 provided between S120 to reach the counter value and S136 to read the next counter value. Thereby, whether the counter value of the timer IC 5 varies normally or not can be determined in a short period of time.

(Fourth Embodiment)

Figure 12:
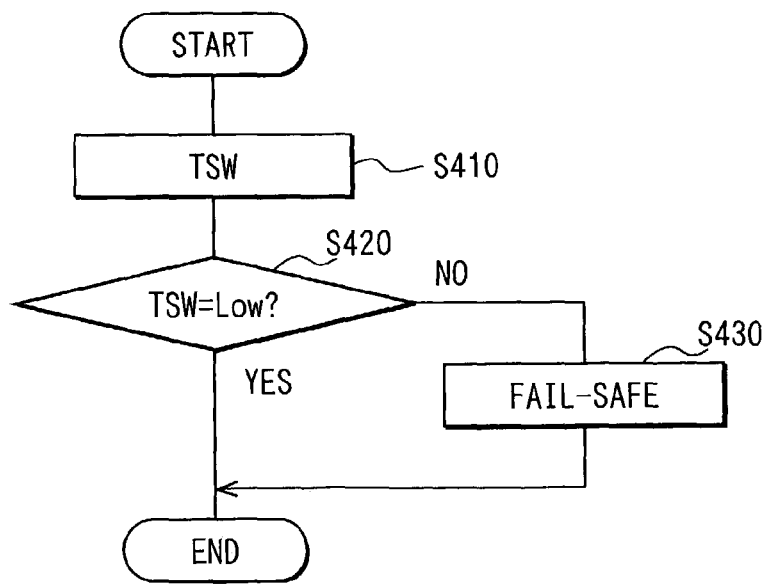
FIG. 12 is a flowchart illustrating a process among the processes executed by the microcomputer in the ECU of a fourth embodiment.

In the ECU 1 of the fourth embodiment, the microcomputer 3 periodically executes the processes of FIG. 12 during the operation thereof. Namely, when the microcomputer 3 starts the processes of FIG. 12, it inhibits, at S410, the timer IC 5 to output the high level power supply activation signal TSW with a "TSW clear instruction" to the timer IC 5. In the subsequent S420, the microcomputer 3 reads the logical level of the signal line L of the power supply activation signal TSW to the drive circuit 15 from the timer IC 5 to determine whether the power supply activation signal TSW from the timer IC 5 is in the low level or not. When the power supply activation signal TSW is in the low level signal, the microcomputer 3 terminates the processes of FIG. 12.

Meanwhile, when it is determined at S420 that the power supply activation signal TSW is not the low level signal (it is the high level signal), the process proceeds to S430. At S430, the predetermined fail-safe process is executed upon determination that the signal line L of the power supply activation signal TSW to the drive circuit 15 from the timer IC 5 is shorted to the high level side. Thereafter, the microcomputer 3 terminates the processes of FIG. 12. As the fail-safe process at S430, occurrence of a failure and diagnosis information indicating the contents of this failure are stored in the non-volatile memory as in the case of S230 of FIG. 2 or FIG. 6 and the likelihood of battery exhaustion is informed to the vehicle driver. Namely, if the signal line L is shorted to the high level side, the power supply IC 9 can no longer stop the output of the power supply voltage Vom, resulting in exhaustion of the battery.

In the ECU 1 of this fourth embodiment, the microcomputer 3 sets the power supply holding signal PI to the drive circuit 15 to the high level (S110) to maintain the condition where the power supply voltage Vom is supplied. Under this state, output of the high level power supply activation signal TSW from the timer IC 5 is forcibly inhibited (S410) and the logical level of the signal line L of the power supply activation signal TSW to the drive circuit 15 from the timer IC 5 is determined (S420). When the logical level of the signal line L is in the high level, it is determined therefrom that the signal line L is shorted to the high level side (S430). Therefore, likelihood of battery consumption can be informed to the vehicle driver by accurately detecting such a failure.

The preferred embodiments of the present invention have been explained above, but the ECU 1 of these embodiments can also be modified as explained below.

(First Modification)

Figure 13:
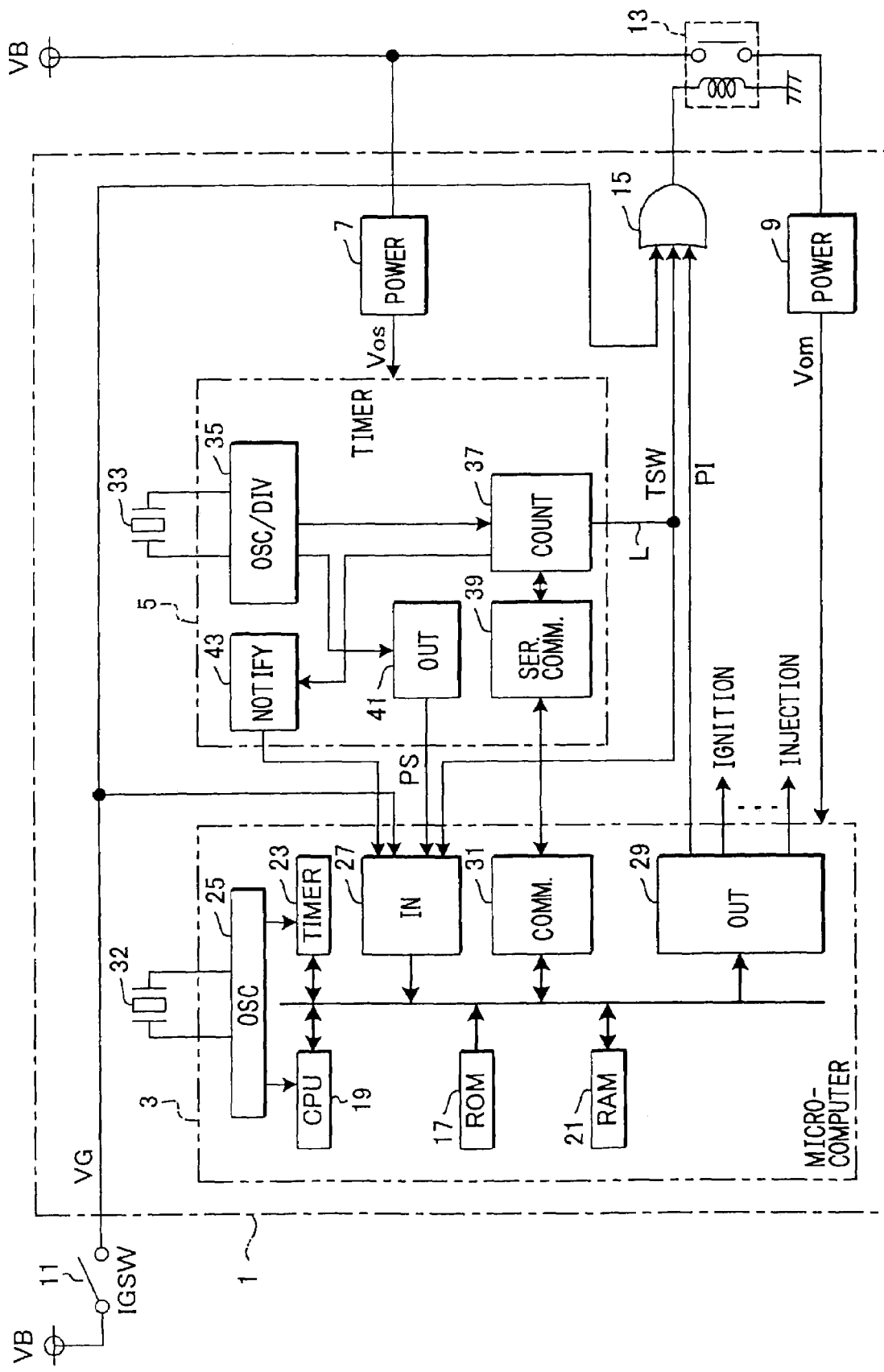
FIG. 13 is a block diagram for explaining the first modification of the first to fourth embodiments.

As illustrated in FIG. 13, a notifying unit 43 is provided. This notifying unit 43 outputs a notifying signal to the external circuits of the timer IC 5 while the counter value (count value of counter 37) is exceeding the predetermined value M (making active the output level of the notifying signal). The microcomputer 3 determines, at S240 in FIG. 2 or FIG. 6, whether the timer IC 5 outputs the notifying signal or not (in more detail, whether the timer IC 5 outputs the notifying signal of the active level or not). When the notifying signal is outputted, it is determined that a failure which disables activation of the power supply IC 9 is generated in the timer IC 5.

Here, it is also allowed that the logical level of notifying signal is read and stored, not at S240, immediately after the activation (for example, immediately after S110 in FIG. 2 or FIG. 6) and the logical level stored is determined, at S240, to be active level or not. Moreover, the predetermined value M basically may equal Ns. However, when the counter value progresses during the delay time until the microcomputer 3 reads the logical level of the notifying signal after the counter value reaches Ns, it may be set to the count value which is assumed to progress from Ns within the delay time.

(Second Modification)

Figure 14:
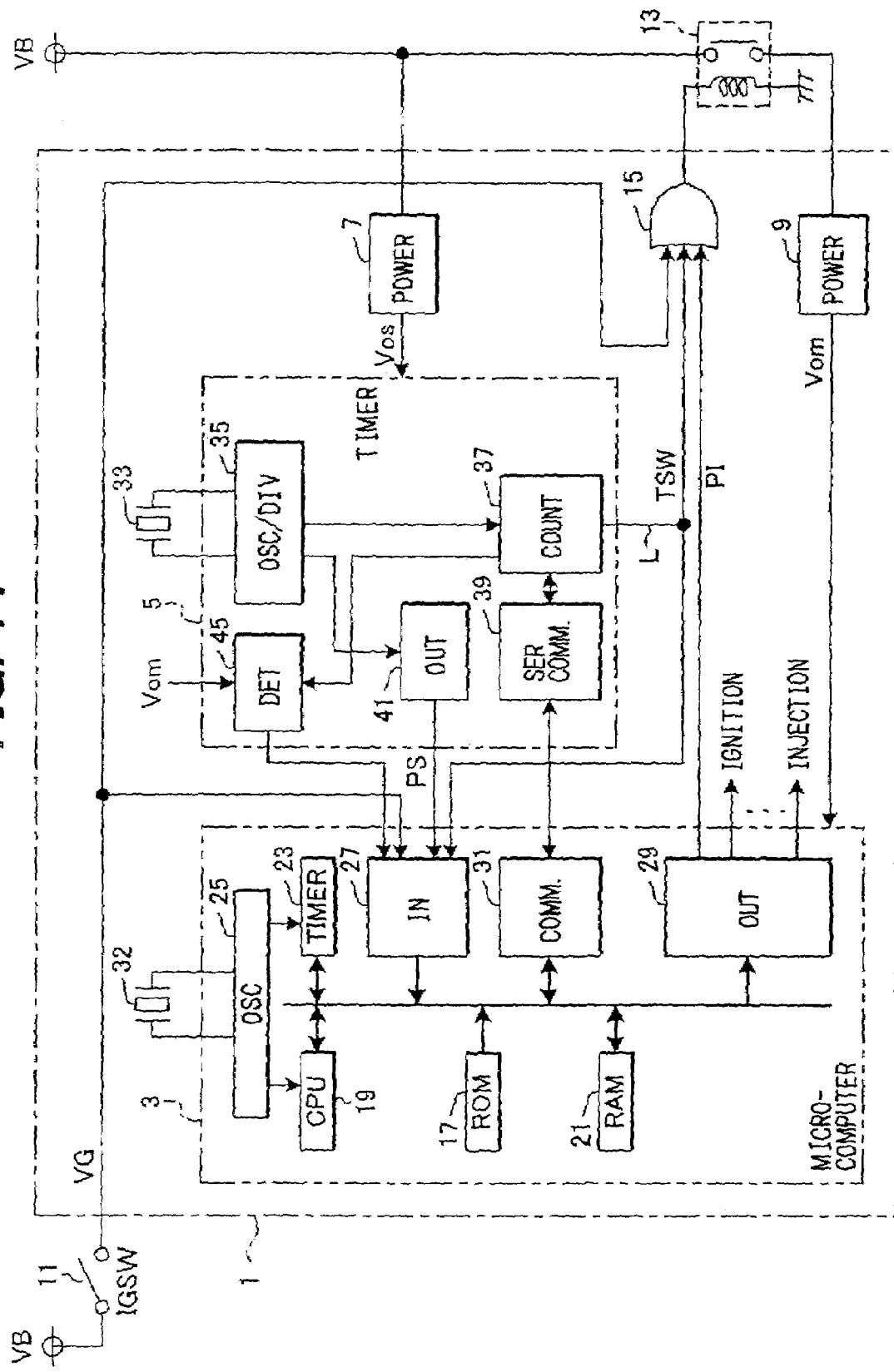
FIG. 14 is a block diagram for explaining the second modification of the first to fourth embodiments.

As illustrated in FIG. 14, a determining unit 45 having the following functions is also provided in the timer IC 5. Namely, the determining unit 45 monitors both the power supply voltage Vom from the power supply IC 9 and a counter value. If the power supply IC 9 does not output the power supply voltage Vom even when the counter value has exceeded Ns after it is once rest, the determining unit 45 determines this event as occurrence of a failure and outputs a failure detection signal to the external circuits of the timer IC 5 (setting the output level of the failure detecting signal to the active level).

The microcomputer 3 determines, when activated by receiving the power supply voltage Vom, whether the timer IC 5 outputs the failure detecting signal or not (in more detail, whether the timer IC 5 outputs the failure detecting signal of the active level or not). When the failure detecting signal is outputted, the microcomputer 3 determines that a failure which disables activation of the power supply IC 9 is generated in the timer IC 5. Depending on such second modification, when a failure disabling activation of the power supply IC 9 is generated in the timer IC 5, the microcomputer 3 can detect occurrence of failure in the functions of timer IC 5 when the IGSW 11 is turned on.

Meanwhile, in the embodiments and modifications, the timer IC 5 as the timer circuit executes the up-counting operation but the timer circuit which executes the down-counting operation can also be applied in the same manner.

Moreover, a switch signal from an external circuit for activating the microcomputer 3 is not limited only to the IGSW signal VG and a key switch signal, for example, which turns on when a key of the vehicle is inserted to the key cylinder may be used in any type of the ECU for vehicle.

What is claimed is:

1. An electronic control apparatus comprising:
   a timer circuit which is operated by a power supply voltage continuously outputted from a first power supply circuit;
   a second power supply circuit which outputs a power supply voltage when any one of a predetermined switch signal inputted from an external circuit and an operation command signal generated within the apparatus is in an active level; and
   a microcomputer which is operated by a power supply voltage outputted from the second power supply circuit,
   wherein the electronic control apparatus activates the microcomputer through processes that the timer circuit starts a counting operation after the switch signal changes to a passive level from the active level, the operation command signal to the second power supply circuit from the timer circuit changes to the active level when the count value of the timer circuit reaches a predetermined specified value and thereby the power supply voltage is outputted from the second power supply circuit;
   wherein the microcomputer executes, when having started operation thereof by receiving the power supply voltage from the second power supply circuit, an activation cause determination process to determine whether a present activation is caused by the switch signal or the timer circuit, maintains a condition that the power supply voltage is outputted from the second power supply circuit by continuously setting the operation command signal to the second power supply circuit to the active level only for a period until the particular process is terminated when it is determined by the activation cause determination process that the present activation is caused by the timer circuit, determines, when it is determined, on the contrary, in the activation cause determination process, that the present activation is caused by the switch signal, whether the count value of the timer circuit exceeds the specified value or the determination value which is set closer to the final value side of the count value of the timer circuit than the specified value and also performs, when the affirmative result is determined, the failure detecting process to determine a failure occurs in the functions of the timer circuit; and the specified value is set to the preceding value of the final value of the count value of the timer circuit and the timer circuit continues the counting operation even after the count value reaches the specified value; and wherein the microcomputer sets, when it is determined by the activation cause determination process that the present activation is caused by the timer circuit, a flag indicating the activation by the timer circuit, determines whether the flag is set or not when it is determined in the activation cause determination process that the present activation is caused by the switch signal and does not determine occurrence of a failure in the failure detecting process when the flag is set.

2. An electronic control apparatus comprising:

a timer circuit which is operated by a power supply voltage continuously outputted from a first power supply circuit;

a second power supply circuit which outputs a power supply voltage when any one of a predetermined switch signal inputted from an external circuit and an operation command signal generated within the apparatus is in an active level; and a microcomputer which is operated by a power supply voltage outputted from the second power supply circuit, wherein:

the electronic control apparatus activates the microcomputer through processes in which the timer circuit starts a counting operation after the switch signal changes to a passive level from the active level, the operation command signal inputted to the second power supply circuit from the timer circuit changes to the active level when the count value of the timer circuit reaches a predetermined specified value and thereby the power supply voltage is outputted from the second power supply circuit, the microcomputer executes, when having started operation thereof by receiving the power supply voltage from the second power supply circuit, an activation cause determination process to determine whether a present activation is caused by the switch signal of the timer circuit, the specified value is set to a value which is present before a maximum value of the count value of the timer circuit, the microcomputer sets, when it is determined by the activation cause determination process that the present activation is caused by the timer circuit, a flag indicating the activation by the timer circuit, and the microcomputer determines, when it is determined that the present activation is caused by the switch signal, that the activation of the second power supply by the timer circuit is a failure under a condition that the flag is not set and the count value of the timer circuit is larger than the specified value.

3. An electronic control apparatus as in claim 2, wherein the microcomputer performs a determination process to read the count value from the timer circuit to determine whether the count value changes normally, and determines that the timer circuit is defective upon determination by the determination process that the count value does not change normally.

4. An electronic control apparatus as in claim 3, wherein the timer circuit is constructed so that the clock frequency for the count operation is variable with an instruction from the microcomputer, and wherein the microcomputer sets, for execution of the determination process, the clock frequency of the timer circuit to a value larger than a usual value.

* * * * *